(12) United States Patent
Keller et al.

(10) Patent No.: US 10,481,980 B2
(45) Date of Patent: Nov. 19, 2019

(54) ENABLING SEGMENTED SOURCE DATA INTROSPECTION WITHIN DISPERSED STORAGE NETWORK (DSN) MEMORY

(71) Applicant: International Business Machines Corporation, Armonk, NY (US)

(72) Inventors: Bryan J. Keller, Chicago, IL (US); Brian F. Ober, Lake in the Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 15/940,396

(22) Filed: Mar. 29, 2018

(65) Prior Publication Data

US 2019/0303241 A1 Oct. 3, 2019

(51) Int. Cl.
  *G06F 11/10* (2006.01)
  *G06F 11/20* (2006.01)
  *G06F 3/06* (2006.01)
  *H04L 29/08* (2006.01)

(52) U.S. Cl.
  CPC ........ *G06F 11/1076* (2013.01); *G06F 3/0604* (2013.01); *G06F 3/0659* (2013.01); *G06F 11/2094* (2013.01); *H04L 67/1097* (2013.01); *G06F 2211/1028* (2013.01)

(58) Field of Classification Search
  CPC .............. G06F 11/1076; G06F 3/0604; G06F 11/2094; G06F 3/0659; G06F 2211/1028; H04L 67/1097
  See application file for complete search history.

(56) References Cited

U.S. PATENT DOCUMENTS

| 5,530,806 A * | 6/1996 | Condon .............. H04L 49/3009 370/397 |
| 8,495,466 B2 | 7/2013 | Cilfone et al. |
| 2004/0151203 A1* | 8/2004 | Gulati ................. H04L 49/3072 370/465 |
| 2005/0163141 A1* | 7/2005 | Katayama ............. H04L 49/103 370/412 |

(Continued)

OTHER PUBLICATIONS

Anonymous, et al.; Combining Multiple Intent Operations into a Single Write; IP.com, IPCOM000248630D; Dec. 22, 2016; 2 pgs.

*Primary Examiner* — Thien Nguyen
(74) *Attorney, Agent, or Firm* — Garlick & Markison; Timothy W. Markison; Timothy D. Taylor

(57) ABSTRACT

A method begins by a first computing device obtaining data for storage in a dispersed storage network (DSN) and determining whether to divide the data into a plurality of independent data units (IDUs). When determined to divide the data, the method continues by dividing the data into the plurality of IDUs, generating an aggregation indicator that links the plurality of IDUs to the data and sending DSN write processing requests and the aggregation indicator to DS processing units. The method continues with a first dispersed storage (DS) processing unit receiving a first DSN write processing request and the aggregation indicator. The method continues by the first DS processing unit dispersed storage error encoding the first IDU to produce encoded data slices, generating aggregation information regarding the plurality of IDUs based on the aggregation indicator and sending the encoded data slices to storage units of the DSN for storage therein.

14 Claims, 6 Drawing Sheets

(56) References Cited

U.S. PATENT DOCUMENTS

| | | | |
|---|---|---|---|
| 2009/0019246 A1* | 1/2009 | Murase | G06F 1/3203 711/162 |
| 2009/0313617 A1* | 12/2009 | Hung | G06F 11/1092 717/168 |
| 2014/0298061 A1* | 10/2014 | Volvovski | G06F 3/0625 713/323 |
| 2016/0292254 A1* | 10/2016 | Dhuse | G06F 16/2228 |
| 2017/0123669 A1* | 5/2017 | Resch | G06F 3/064 |

* cited by examiner

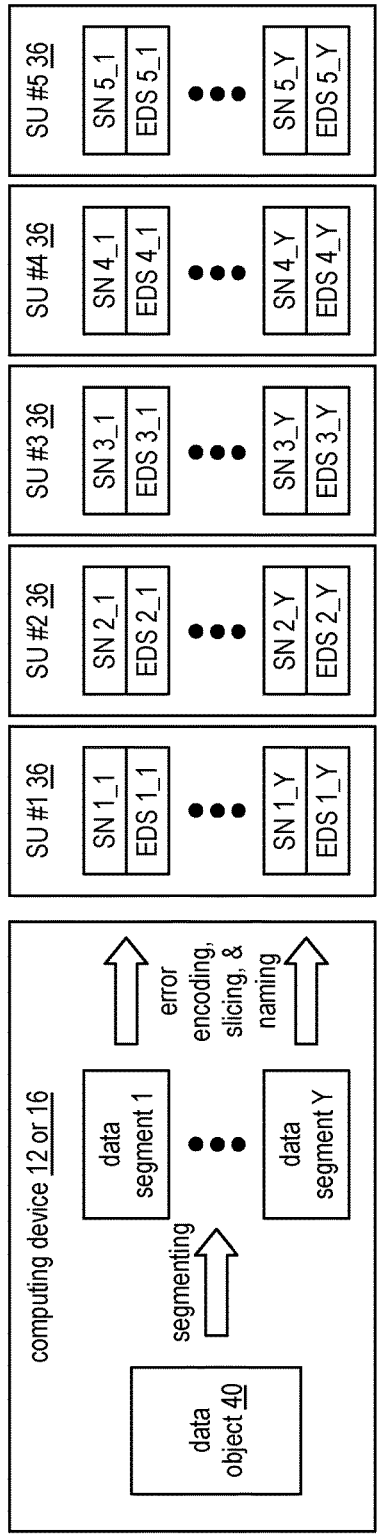
FIG. 3
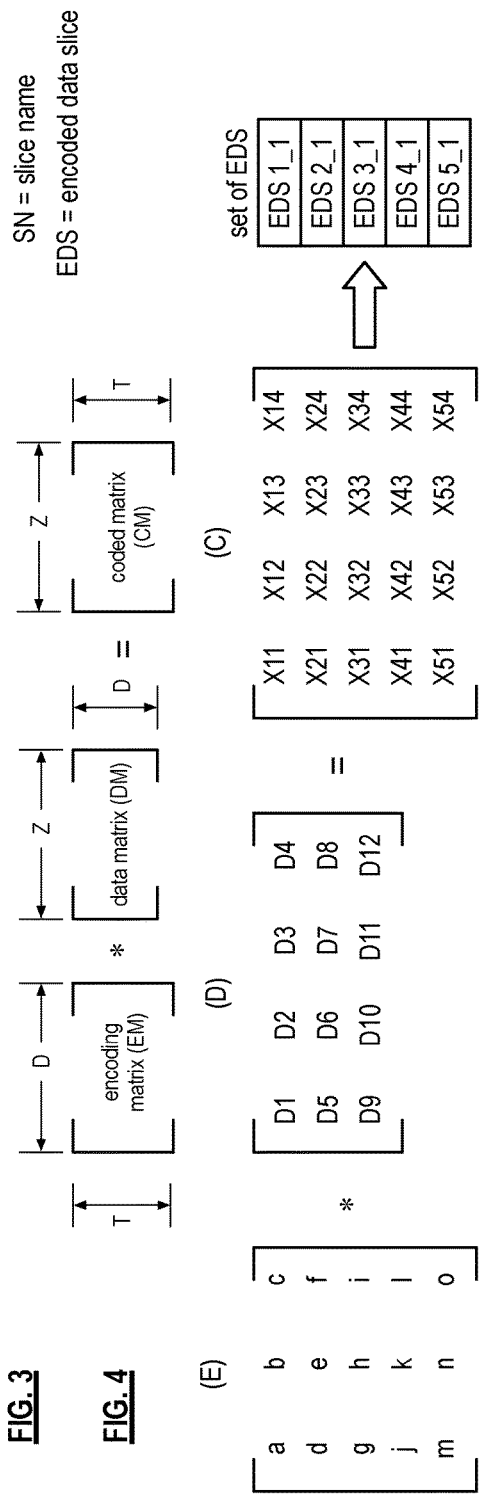
FIG. 4
FIG. 5
FIG. 6

ENABLING SEGMENTED SOURCE DATA INTROSPECTION WITHIN DISPERSED STORAGE NETWORK (DSN) MEMORY

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersed storage error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
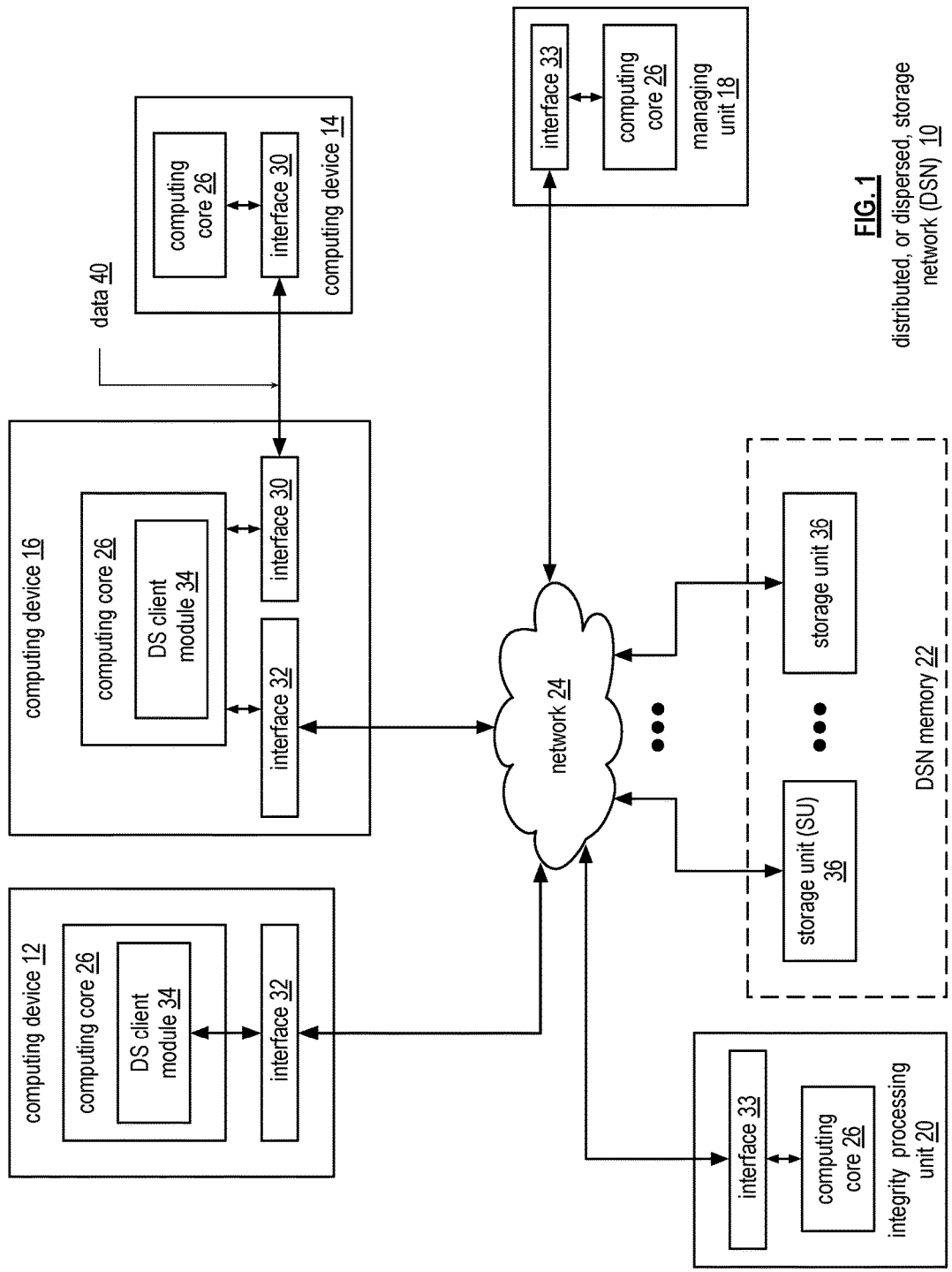
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
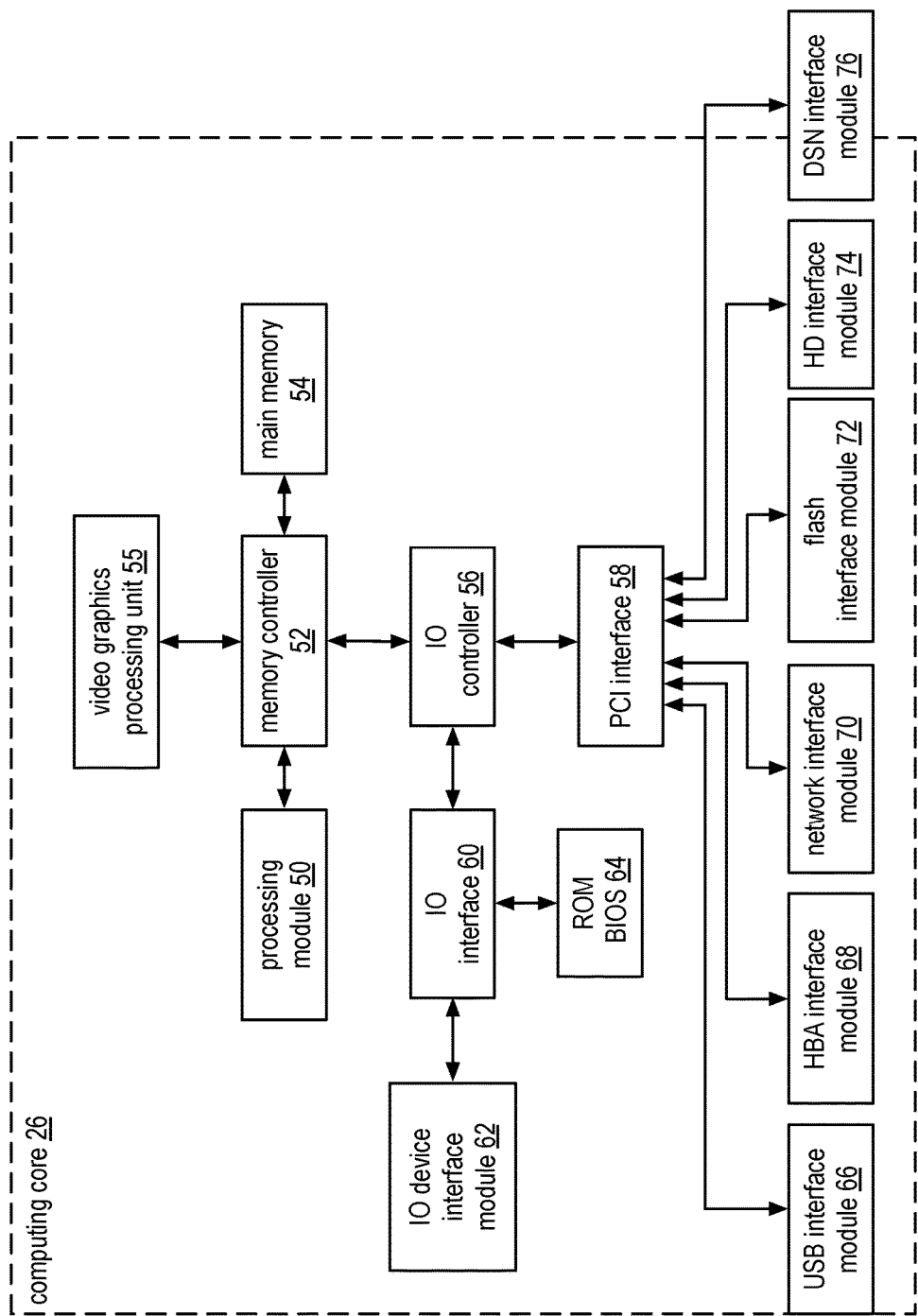
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 79 is shown in FIG. 6. As shown, the slice name (SN) 79 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
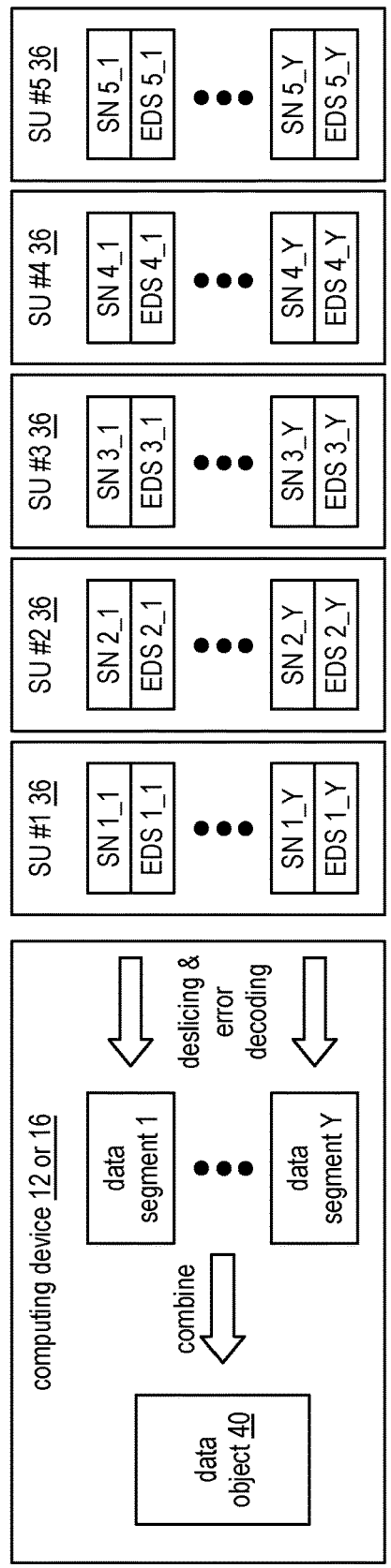
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
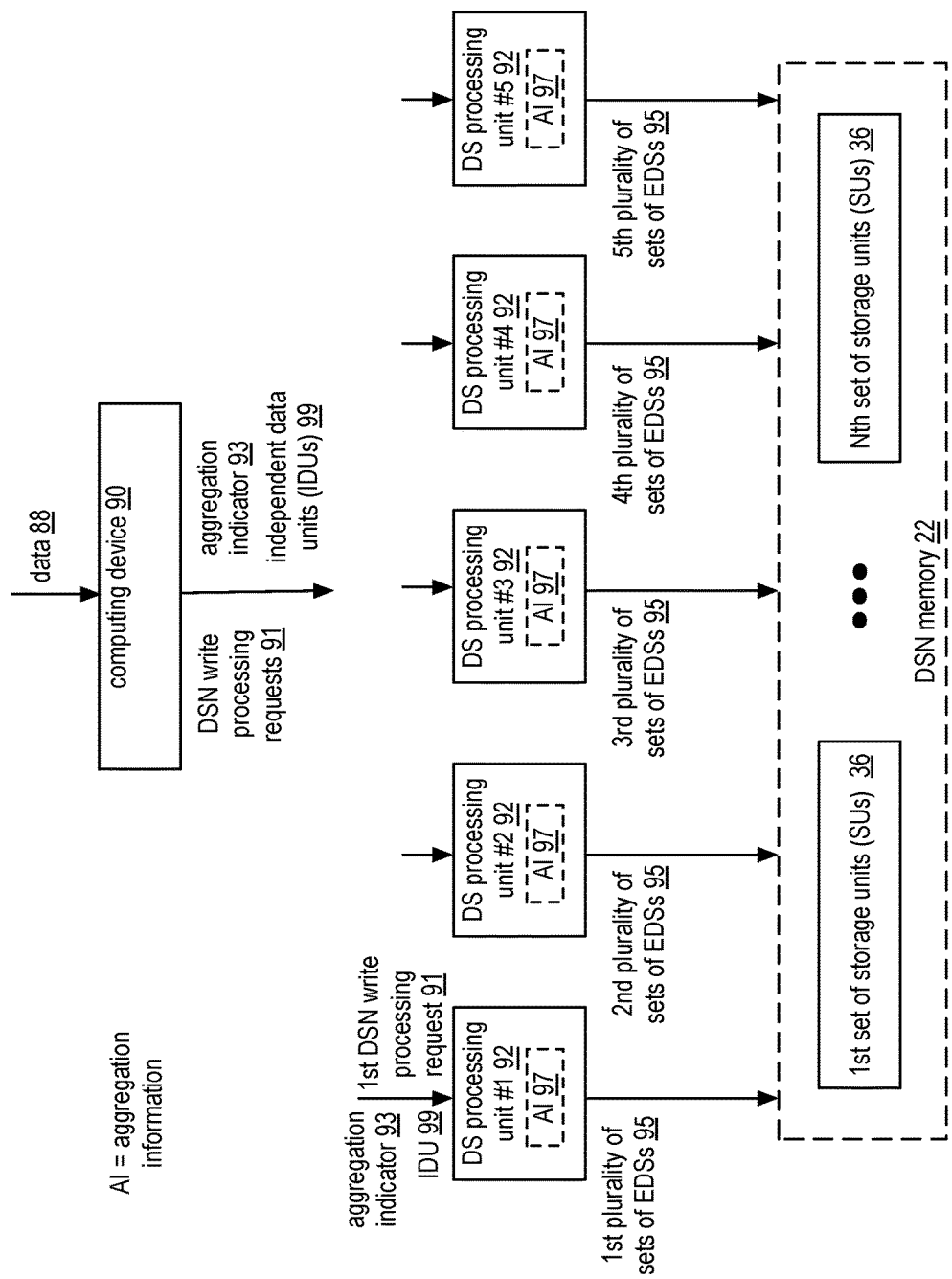
FIG. 9 is a schematic block diagram of another embodiment of a dispersed storage network (DSN) in accordance with the present invention.

FIG. 9 is a schematic block diagram of another embodiment of a dispersed storage network (DSN) that includes a computing device 90, dispersed storage (DS) processing units #1-5 92, and the DSN memory 22 of FIG. 1 that includes a plurality of sets of storage units 36. The computing device 90 may be implemented by one of the DS processing units 92. Further, the computing device 90 may be implemented as one of the computing devices 12-16, the managing unit 18, and the integrity processing unit 20 of FIG. 1. The DSN is operable to store source data (e.g., data 88) in the DSN memory (e.g., in the plurality of sets of storage units 36). Source data within the DSN memory may take many forms and in some cases, specific pieces of source data may belong to a larger user addressable entity. Addressable aggregated source data (AASD) may be an addressable entity that appears as a single piece of the source data to a reader and may be created by uploading multiple pieces of non-aggregated source data (NDS).

As an example, a user of a user device may want to store a 5 terabyte (TB) piece of source data in DSN memory. Due to the size of the source data, it may be more advantageous to divide up the source data into smaller pieces of source data that may be sent to the DSN memory in parallel. After the source data has been stored, the user of the user device may subsequently retrieve the original source data in its original form. The DSN may also utilize various levels of introspection within DSN memory, that would be benefited by having context about what source data belongs in the AASD or NDS categories. As an example of the various levels of introspection, the DSN may utilize one or more of access logging, asynchronous notifications and data analytics. Thus, improved introspection may be achieved within DSN memory such that AASD and NSD categorized source data can be determined and communicated.

A DSN may classify a certain size of data 88 as a large (e.g., 5TB, 20 TB, etc.) amount of data. Note that it is contemplated that over time, as storage capacity increases, and/or as processing time decreases, a DSN that once classified 5 TB as a large piece of data, may subsequently classify 5 TB as a normal piece of data and at least 500 TBs to be a large piece of data. In an example, the determining what size of data is classified as large may be based on available memory of the DSN, total memory of the DSN, available bandwidth of the DSN, and other performance characteristics. As such, the DSN may be operable to divide the data into smaller pieces of source data and transfer the smaller pieces to the DSN memory in parallel.

As an example of the determining whether source data is AASD or NSD, the computing device may obtain request specific information regarding the data request (e.g., a new request type, a specific request header, etc.). As a further example of the determining, the computing device may utilize textual mapping or manifest. When a determination that the source data is AASD is made, the computing device may then evaluate whether the AASD is prepared to be externally addressed. For example, the computing device may determine that the AASD may not have all of its segments transferred and stored. The evaluation may include the computing device utilizing information in the request that indicates the number of expected parts of the AASD. Thus, the computing device may evaluate AASD addressability by comparing the expected number of parts to the source data that exists within DSN memory. The evaluation may also include receiving an indicator in the request which enforces the status of the AASD addressability.

As such, the DS processing unit would be operable to determine whether the source data is a fully addressable AASD, an incomplete AASD (which is not addressable) or an NSD. The computing device (e.g., a DS processing unit) may then make the source data addressability information available to both internal DSN and external DSN computing devices so that for a particular piece of source data, a computing device may determine whether the source data is a fully addressable AASD, an incomplete AASD (e.g., not addressable) or an NSD. The source data addressability information may be integrated into the various levels of introspection (e.g., access logging, event notifications, statistics, etc.).

In an example of operation, the computing device 90 receives a data request that includes data 88 (e.g., 5 TB of source data) for storage. The computing device may then determine whether to divide the data (e.g., into a plurality of independent data units (IDUs)). For example, the computing device may evaluate the data request to determine whether the data 88 represents an AASD or an NSD. In this example, when the computing device determines the data 88 represents an AASD, the computing device determines to divide the data 88. The determination of whether to divide the data may be based on one or more of the size of the data being greater than a first threshold difference, the size of the data in comparison with available memory of the DSN being greater than a second threshold difference, and an estimated processing time of the data being greater than a DSN processing time threshold. For example, the computing device may determine to divide the data when the size of the data (e.g., 5 TB) is greater than a threshold difference (e.g., 100×) of a historical average size of data (e.g., 60 GB) over a time period (e.g., 5 days, 3 months, 2 years, etc.).

When the computing device 90 determines to divide the data 88, the computing device 90 divides the data into the plurality of independent data units 99 and generates an aggregation indicator that links the plurality of independent data units 99 to the data 88. For example, the aggregation indicator 93 may be a field (e.g., header) within the first DSN write processing request that indicates whether the data 88 is aggregated or non-aggregated. As another example, the aggregation indicator 93 may be textual mapping data or manifest data regarding how the data 88 is aggregated. As yet another example, the aggregation indicator 93 may be information regarding the plurality of independent data units 99 (e.g., a size, a data source name, an independent data unit source name, encoding information, an order position, etc.).

Having generated the aggregation indicator 93, the computing device 90 sends DSN write processing requests 91 (e.g., which may include the IDUs 99) to DS processing units #1-5 92 of the DSN regarding at least some of the plurality of independent data units. In one example, the aggregation indicator 93 and corresponding IDUs 99 are included in the DSN write processing requests 91. The DS processing units 1-5 92 receive the aggregation indicator 93 and a corresponding one of the DSN write processing requests 91. For example, a first DS processing unit #1 92 receives a first DSN write processing request 91 regarding a first independent data unit and the aggregation indicator 93, a second DS processing unit #2 92 receives a second DSN write processing request 91 regarding a second independent data unit and the aggregation indicator 93 and so on up to the fifth DS processing unit #5 92 receives a fifth DSN write processing request 91 regarding a fifth independent data unit and the aggregation indicator 93.

Having received the first write processing request 91 and the aggregation indicator 93, the first DS processing unit #1 92 dispersed storage error encodes the first independent data unit to produce a first plurality of sets of encoded data slices 95. The first DS processing unit #1 92 also generates aggregation information 97 regarding the plurality of independent data units based on the aggregation indicator 93. In one instance, the aggregation information 97 may be a copy of the of aggregation indicator 93. In another instance, the aggregation information 97 may be a portion of the of aggregation indicator 93. For example, the portion may be a relevant portion (e.g., information regarding other IDUs, information the first DS processing module needs to process data access requests, etc.) to the first DS processing unit #1 92 to enable the first DS processing unit to retrieve data (e.g., the 5 TB source data) in response to retrieval requests. As an example, the first DS processing unit #1 92 may utilize the aggregation information 97 to process a retrieval request regarding the data 88 or the first independent data unit.

Having produced the first plurality of sets of encoded data slices 95, the first DS processing unit #1 92 sends the first plurality of sets of encoded data slices 95 to a first set of storage units (e.g., 1$^{st}$ set of SUs 36) of the DSN memory 22 for storage therein. The first DS processing unit #1 92 then may determine whether the first plurality of sets of encoded data slices have been successfully stored. Note the DS processing unit may utilize a three phase writing process including a first phase that includes the writing, a second phase that includes one of a commit or rollback, and a third phase that includes one of a finalize or undo.

For example, the first DS processing unit #1 92 receives a first plurality of sets of write responses regarding the first plurality of sets of encoded data slices. When at least a write threshold number of favorable write slice responses (indicating for each set of the first plurality of sets of encoded data slices have been received within a response timeframe, the first DS processing unit #1 92 may send a first plurality of sets of write commit requests to at least some of the first set of storage units (e.g., SUs that returned the favorable write slice responses).

The first DS processing unit #1 92 then may receive write commit responses from the at least some of the first set of storage units. When the first DS processing unit #1 92 has received a write threshold number of write commit responses within a response timeframe, the first DS processing unit #1 92 may send write finalize requests to the at least some of the first set of storage units 36.

The first DS processing unit #1 92 then may receive at least the write threshold number of write finalize responses from the at least some of the first set of storage units 36. When the first DS processing unit #1 92 has received at least the write threshold number of write finalize responses within the response timeframe from the at least some of the first set of storage units 36, the first DS processing unit #1 92 may generate an indication to reflect that the first independent data unit is an addressable unit.

When the first DS processing unit #1 92 does not receive the write threshold number of write slice responses, write commit responses and write finalize responses within a certain timeframe (e.g., 100 milliseconds, 1 second, 2 minutes, etc.), the first DS processing unit may resend one or more corresponding write slice requests, write commit or rollback requests, and/or write finalize or undo requests. Alternatively, or in addition to, the first DS processing module may generate an indication to reflect that the first independent data unit is a non-addressable unit.

Figure 10:
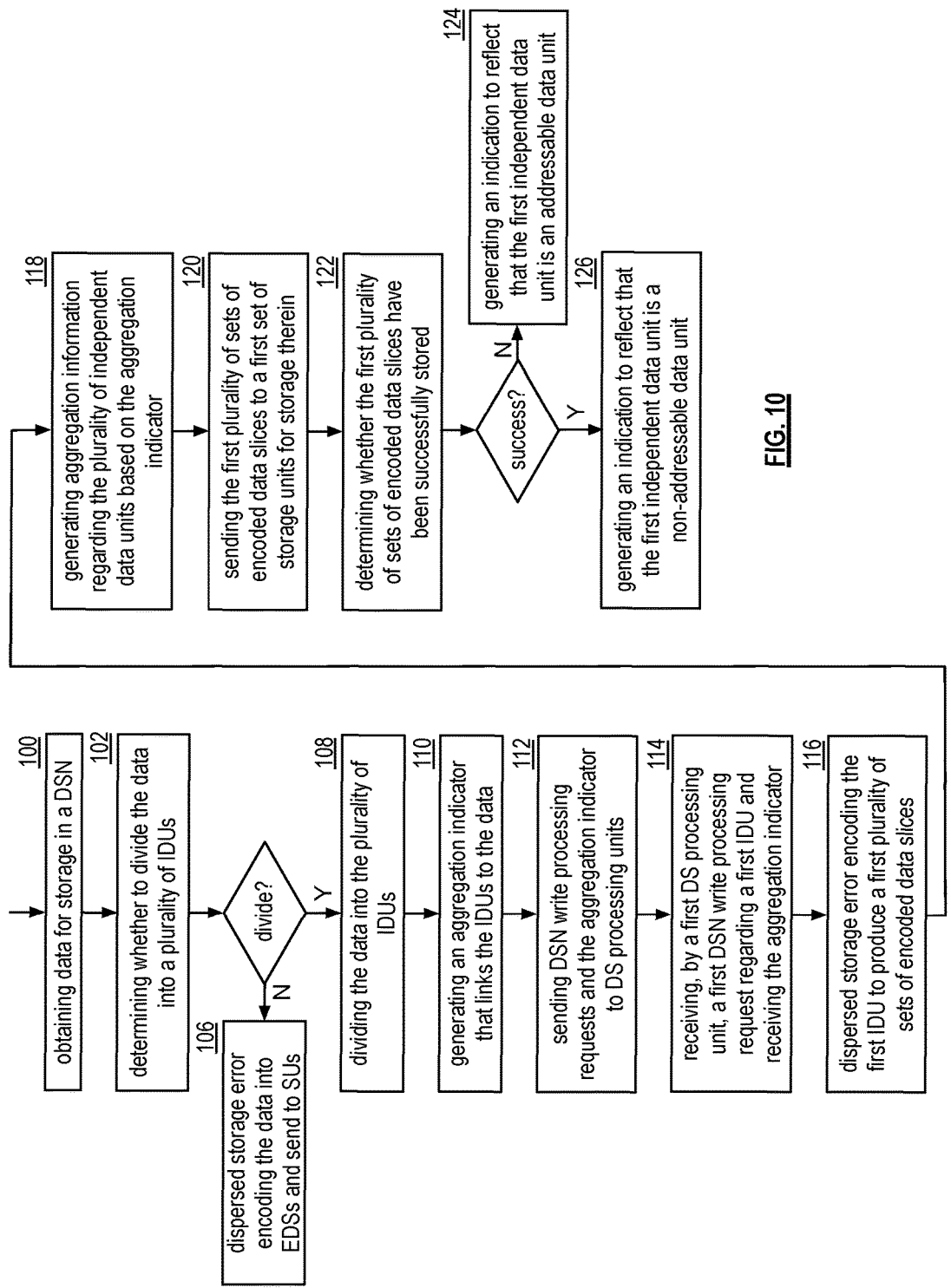
FIG. 10 is a flowchart illustrating an example of a method of enabling segmented source data introspection within dispersed storage network (DSN) memory in accordance with the present invention.

FIG. 10 is a flowchart of an example of a method of enabling segmented source data introspection within dispersed storage network (DSN) memory. The method begins with step 100, where a first computing device obtains (e.g., receives, generates, etc.) data for storage in a dispersed storage network (DSN). The method continues with step 102, where the first computing device determines whether to divide the data into a plurality of independent data units. When not determined to divide the data, the method continues with step 106, where the first computing device dispersed storage error encodes the data to produce one or more sets of encoded data slices and sends at least one of the one or more sets of encoded data slices to storage units of the DSN for storage therein.

When determined to divide the data, the method continues with step 108, where the first computing device divides the data into the plurality of independent data units. The method continues with step 110, where the first computing device generates an aggregation indicator that links the plurality of independent data units to the data. As an example, the aggregation indicator may be one or more of a field within the first DSN write processing request that indicates whether the data is aggregated or non-aggregated, textual mapping data regarding how the data is aggregated and information regarding the plurality of independent data units (e.g., a size, a data source name, an independent data unit source name, encoding information, an order position, etc.).

The method continues with step 112, where the first computing device sends DSN write processing requests and the aggregation indicator to DS processing units of the DSN regarding at least some of the plurality of independent data units. The method continues with step 114, where a first DS processing unit of the DS processing units receives a first DSN write processing request of the DSN write processing requests and the aggregation indicator. In this example, the first DS processing request is regarding a first independent data unit of the plurality of independent data units.

The method continues with step 116, where the first DS processing unit dispersed storage error encodes the first independent data unit to produce a first plurality of sets of encoded data slices. The method continues with step 118, where the first DS processing unit generates aggregation information regarding the plurality of independent data units based on the aggregation indicator. In an example, the aggregation information may be utilized by the first DS processing unit to process a retrieval request regarding the data or the first independent data unit. The aggregation information may be a copy of the aggregation indicator or may be a portion of the aggregation indicator.

The method continues with step 120, where the first DS processing unit sends the first plurality of sets of encoded data slices to a first set of storage units of the DSN for storage therein. The method continues with step 122, where the first DS processing unit determines whether the first plurality of sets of encoded data slices have been successfully stored in the first set of storage units.

When the first plurality of sets of encoded data slices have not been successfully stored, the method branches to step 126, where the first DS processing unit generates an indication to reflect that the first independent data unit is a non-addressable data unit. When the first plurality of sets of encoded data slices have been successfully stored the method continues to step 124, where the first DS processing unit generates the indication to reflect that the first independent data unit is an addressable unit. In one embodiment, the DS processing unit may make the indication public to the DSN. Note a second DS processing unit may perform similar steps as the first DS processing unit for second independent data unit of the plurality of independent data units. Further note a computer readable storage medium that includes one or more elements that store operational instructions that when executed by a computing device, may be operable to perform the above method.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   obtaining, by a first computing device, data for storage in a dispersed storage network (DSN);
   determining, by the first computing device, whether to divide the data into a plurality of independent data units;
   when determined to divide the data:
      dividing, by the first computing device, the data into the plurality of independent data units;
      generating, by the first computing device, an aggregation indicator that links the plurality of independent data units to the data;
      sending, by the first computing device, DSN write processing requests and the aggregation indicator to DS processing units of the DSN regarding at least some of the plurality of independent data units;
      receiving, by a first dispersed storage (DS) processing unit of the DS processing units, a first DSN write processing request of the DSN write processing requests and the aggregation indicator, wherein the first DSN write processing request is regarding a first independent data unit of the plurality of independent data units;
      dispersed storage error encoding, by the first DS processing unit, the first independent data unit to produce a first plurality of sets of encoded data slices;
      generating, by the first DS processing unit, aggregation information regarding the plurality of independent data units based on the aggregation indicator, wherein the first DS processing unit utilizes the aggregation information to process a retrieval request regarding the data or the first independent data unit;
      sending, by the first DS processing unit, the first plurality of sets of encoded data slices to a first set of storage units of the DSN for storage therein;
      determining, by the first DS processing unit, whether the first plurality of sets of encoded data slices have been successfully stored in the first set of storage units;
      when the first plurality of sets of encoded data slices have not been successfully stored, generating, by the first DS processing unit, an indication to reflect that the first independent data unit is a non-addressable data unit; and
      when the first plurality of sets of encoded data slices have been successfully stored, generating, by the first DS processing unit, the indication to reflect that the first independent data unit is an addressable unit.

2. The method of claim 1, wherein the indication is made public to the DSN.

3. The method of claim 1 further comprises:
   when not determined to divide the data:
      dispersed storage error encoding, by the first computing device, the data to produce one or more sets of encoded data slices; and
      sending, by the first computing device, at least one of the one or more sets of encoded data slices to storage units of the DSN for storage therein.

4. The method of claim 1 further comprises:
   receiving, by a second DS processing unit of the DS processing units, a second DSN write processing request of the DSN write processing requests and the aggregation indicator, wherein the second DSN write processing request is regarding a second independent data unit of the plurality of independent data units;
   dispersed storage error encoding, by the second DS processing unit, the first independent data unit to produce a second plurality of sets of encoded data slices;
   generating, by the second DS processing unit, second aggregation information regarding the plurality of independent data units based on the aggregation indicator, wherein the second DS processing unit utilizes the second aggregation information to process a retrieval request regarding the data or the second independent data unit;
   sending, by the second DS processing unit, the second plurality of sets of encoded data slices to a second set of storage units of the DSN for storage therein;
   determining, by the second DS processing unit, whether the second plurality of sets of encoded data slices have been successfully stored in the second set of storage units;
   when the second plurality of sets of encoded data slices have not been successfully stored, generating, by the second DS processing unit, a second indication to reflect that the second independent data unit is a non-addressable data unit; and
   when the second plurality of sets of encoded data slices have been successfully stored, generating, by the second DS processing unit, the second indication to reflect that the second independent data unit is an addressable unit.

5. The method of claim 1, wherein the aggregation indicator comprises one or more of:
   a field within the first DSN write processing request that indicates whether the data is aggregated or non-aggregated;
   textual mapping data regarding how the data is aggregated; and
   information regarding the plurality of independent data units.

6. The method of claim 1, wherein the aggregation information comprises one of:
   a copy of the aggregation indicator; and
   a portion of the aggregation indicator.

7. The method of claim 1, wherein the first computing device is the first DS processing unit.

8. A non-transitory computer readable storage medium comprises:

a first memory element that stores operational instructions that, when executed by a first computing device of a dispersed storage network (DSN), causes the first computing device to:
obtain data for storage in a dispersed storage network (DSN);
a second memory element that stores operational instructions that, when executed by the first computing device, causes the first computing device to:
determine whether to divide the data into a plurality of independent data units; and
when determined to divide the data:
  divide the data into the plurality of independent data units;
  generate an aggregation indicator that links the plurality of independent data units to the data; and
  send DSN write processing requests and the aggregation indicator to DS processing units of the DSN regarding at least some of the plurality of independent data units;
a third memory element that stores operational instructions that, when executed by a first dispersed storage (DS) processing unit of the DS processing units, causes the first DS processing unit to:
  receive a first DSN write processing request of the DSN write processing requests and the aggregation indicator, wherein the first DSN write processing request is regarding a first independent data unit of the plurality of independent data units;
  dispersed storage error encode the first independent data unit to produce a first plurality of sets of encoded data slices;
  generate aggregation information regarding the plurality of independent data units based on the aggregation indicator, wherein the first DS processing unit utilizes the aggregation information to process a retrieval request regarding the data or the first independent data unit;
  send the first plurality of sets of encoded data slices to a first set of storage units of the DSN for storage therein;
a fourth memory element that stores operational instructions that, when executed by the first DS processing unit, causes the first DS processing unit to:
  determine whether the first plurality of sets of encoded data slices have been successfully stored in the first set of storage units;
  when the first plurality of sets of encoded data slices have not been successfully stored, generate an indication to reflect that the first independent data unit is a non-addressable data unit; and
  when the first plurality of sets of encoded data slices have been successfully stored, generate the indication to reflect that the first independent data unit is an addressable unit.

9. The non-transitory computer readable storage medium of claim 8, wherein the fourth memory element stores further operational instructions that, when executed by the first DS processing unit, cause the first DS processing unit to make the indication public to the DSN.

10. The non-transitory computer readable storage medium of claim 8, wherein the second memory element stores further operational instructions that when executed by the first computing device, cause the first computing device to:
when not determined to divide the data:
  dispersed storage error encode the data to produce one or more sets of encoded data slices; and
  send at least one of the one or more sets of encoded data slices to storage units of the DSN for storage therein.

11. The non-transitory computer readable storage medium of claim 8 further comprises:
a fifth memory element that stores operational instructions that, when executed by a second DS processing unit of the DSN, causes the second DS processing unit to:
  receive a first DSN write processing request of the DSN write processing requests and the aggregation indicator, wherein the first DSN write processing request is regarding a first independent data unit of the plurality of independent data units;
  dispersed storage error encode the first independent data unit to produce a first plurality of sets of encoded data slices;
  generate aggregation information regarding the plurality of independent data units based on the aggregation indicator, wherein the first DS processing unit utilizes the aggregation information to process a retrieval request regarding the data or the first independent data unit;
  send the first plurality of sets of encoded data slices to a first set of storage units of the DSN for storage therein; and
a sixth memory element that stores operational instructions that, when executed by the second DS processing unit, causes the second DS processing unit to:
  determine whether the first plurality of sets of encoded data slices have been successfully stored in the first set of storage units;
  when the first plurality of sets of encoded data slices have not been successfully stored, generate an indication to reflect that the first independent data unit is a non-addressable data unit; and
  when the first plurality of sets of encoded data slices have been successfully stored, generate the indication to reflect that the first independent data unit is an addressable unit.

12. The non-transitory computer readable storage medium of claim 8, wherein the aggregation indicator comprises one or more of:
  a field within the first DSN write processing request that indicates whether the data is aggregated or non-aggregated;
  textual mapping data regarding how the data is aggregated; and
  information regarding the plurality of independent data units.

13. The non-transitory computer readable storage medium of claim 8, wherein the aggregation information comprises one of:
  a copy of the aggregation indicator; and
  a portion of the aggregation indicator.

14. The non-transitory computer readable storage medium of claim 8, wherein the first computing device is the first DS processing unit.

* * * * *